(12) United States Patent
Olsson et al.

(10) Patent No.: US 10,895,701 B1
(45) Date of Patent: Jan. 19, 2021

(54) LIGHT GUIDE STRUCTURE WITH MULTIPLE ENTRANCES

(71) Applicant: Telefonaktiebolaget LM Ericsson (publ), Stockholm (SE)

(72) Inventors: Magnus L. Olsson, Klagshamn (SE); Alexander Hunt, Tygelsjö (SE); Andreas Kristensson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/572,845

(22) Filed: Sep. 17, 2019

(51) Int. Cl.
*G02B 6/32* (2006.01)
*G02B 6/42* (2006.01)
*H04B 10/116* (2013.01)

(52) U.S. Cl.
CPC ............. *G02B 6/4206* (2013.01); *G02B 6/42* (2013.01); *H04B 10/116* (2013.01)

(58) Field of Classification Search
CPC ....... G02B 6/4206; G02B 6/42; H04B 10/116
See application file for complete search history.

(56) References Cited

U.S. PATENT DOCUMENTS

| | | | |
|---|---|---|---|
| 4,001,577 A | 1/1977 | Albanese | |
| 6,885,792 B2 | 4/2005 | Eggleton et al. | |
| 7,538,945 B2 | 5/2009 | Hikichi et al. | |
| 7,636,522 B2 | 12/2009 | Nagarajan et al. | |
| 8,594,503 B2 | 11/2013 | Roelkens et al. | |
| 9,638,591 B1* | 5/2017 | Sarcia | G01L 1/247 |
| 2002/0164120 A1 | 11/2002 | Perner | |
| 2003/0235370 A1 | 12/2003 | Taillaert et al. | |
| 2010/0098439 A1 | 4/2010 | Shin et al. | |
| 2013/0163089 A1* | 6/2013 | Bohn | G02B 27/0172 359/630 |
| 2014/0086586 A1 | 3/2014 | Voutilainen et al. | |
| 2014/0270758 A1 | 9/2014 | Nejadmalayeri et al. | |
| 2015/0070327 A1 | 3/2015 | Hsieh et al. | |

(Continued)

FOREIGN PATENT DOCUMENTS

| | | | |
|---|---|---|---|
| DE | 10160233 A1 | 6/2003 | |
| WO | WO-2017134412 A1 * | 8/2017 | G02B 27/0093 |

(Continued)

*Primary Examiner* — Ellen E Kim
(74) *Attorney, Agent, or Firm* — Coats & Bennett, PLLC

(57) ABSTRACT

The light communication solution presented herein uses waveguides with multiple entrances to efficiently collect light used for light communications and propagate that collected light to a sensor. To that end each waveguide entrance, or at least all but the initial waveguide entrance, is configured to not only collect and input the light into the TIR waveguide, but also to maintain TIR of light already propagating within the TIR waveguide. In so doing, the solution presented herein increases the amount of light available for light communications. Further, because each waveguide may channel light from multiple collection points to a single sensor, the solution presented herein reduces the number of sensors needed for the light communications. The solution presented herein facilitates the implementation of light communications for a wide variety of devices (e.g., cellular telephones, tablets, smartphones, smart watches, smart glasses, etc.) and/or in a wide variety of scenarios.

23 Claims, 8 Drawing Sheets

(56) References Cited

U.S. PATENT DOCUMENTS

| | | |
|---|---|---|
| 2015/0195044 A1 | 7/2015 | Nejadmalayeri et al. |
| 2015/0331545 A1 | 11/2015 | Wassvik et al. |
| 2015/0341115 A1 | 11/2015 | Ke |
| 2016/0070065 A1* | 3/2016 | Qi .................... G02B 6/125 398/58 |
| 2017/0108375 A1 | 4/2017 | Brueck et al. |
| 2017/0248734 A1 | 8/2017 | Barfoot et al. |
| 2018/0176739 A1 | 6/2018 | Zhang et al. |
| 2018/0205457 A1 | 7/2018 | Scheim et al. |
| 2018/0302158 A1 | 10/2018 | Norval et al. |
| 2018/0302159 A1 | 10/2018 | Ritchie |
| 2019/0041634 A1* | 2/2019 | Popovich ............ A61B 3/113 |
| 2019/0056591 A1* | 2/2019 | Tervo ............. G02B 27/0081 |
| 2019/0114484 A1* | 4/2019 | Keech ............. G02B 27/0172 |
| 2019/0182441 A1* | 6/2019 | Saleh ................ G01J 3/0221 |
| 2019/0235252 A1* | 8/2019 | Freedman ............ G06F 3/011 |

FOREIGN PATENT DOCUMENTS

| | | |
|---|---|---|
| WO | 2017197013 A1 | 11/2017 |
| WO | 2018115837 A1 | 6/2018 |
| WO | 2018130850 A1 | 7/2018 |

\* cited by examiner

LIGHT GUIDE STRUCTURE WITH MULTIPLE ENTRANCES

BACKGROUND

WiFi is a wireless technology that uses electromagnetic waves to wirelessly connect multiple devices within a particular area to each other and/or to connect one or more wireless devices within a particular area to the internet. While WiFi has been incredibly useful and popular in recent years, it is expected that the need for more bandwidth will soon lead to replacing WiFi or complementing WiFi with alternative wireless technologies.

Light Fidelity (LiFi), which uses light within certain wavelength ranges for local area wireless communications, represents one alternative wireless technology that may replace or complement WiFi. LiFi systems rely on visible, infrared, and/or near ultraviolet spectrum waves. By modulating a light source, e.g., a light emitting diode, a LiFi transmitter transmits high speed signals detectable by a photodetector. The photodetector converts the detected light to electrical current, which is further processed by the receiver to interpret the detected light.

The visible light spectrum is 10,000 times larger than the radio frequency spectrum. LiFi is therefore expected to increase the bandwidth achievable by WiFi alone by a factor of 100. Further, LiFi tends to be more suitable in high density and/or high interference environments, e.g., airplanes, office buildings, hospitals, power plants, etc. Thus, considerable focus has recently been given to improving LiFi technology and/or adapting LiFi technology for specific applications and/or devices.

SUMMARY

The solution presented herein uses waveguides with multiple entrances to efficiently collect light used for light communications and propagate that collected light to a sensor. In so doing, the solution presented herein increases the amount of light available for light communications. Further, because each waveguide may channel light from multiple collection points to a single sensor, the solution presented herein reduces the number of sensors needed for the light communications. The waveguide solution presented herein may be implemented inside a device and/or along an exterior surface, e.g., housing or casing, of a device. As such, the solution presented herein also enables the implementation of light communications for a wide variety of devices (e.g., cellular telephones, tablets, smartphones, smart watches, smart glasses, etc.) and/or in a wide variety of scenarios.

One exemplary embodiment comprises a detection system for light communications. The detection system comprises a total internal reflection (TIR) waveguide and a light sensor. The TIR waveguide comprise a first structure, a diffusive element, and two or more waveguide entrances. The first structure has a first index of refraction, where a second index of refraction abutting the first structure is less than the first index of refraction such that light input to the TIR waveguide propagates along the TIR waveguide within the first structure. The diffusive element is disposed along an internal edge of the first structure at a first location of the TIR waveguide, and is configured to disrupt the propagation of the light along the TIR waveguide. The two or more waveguide entrances are each at a corresponding location offset in a first direction along the TIR waveguide from the first location. Each of the two or more waveguide entrances is configured to collect light associated with the light communications and input the collected light to the first structure at the corresponding second location to propagate the collected light to the first location. At least one of the two or more waveguide entrances is further configured to maintain TIR of the light already propagating along the TIR waveguide within the first structure. The light sensor is disposed adjacent an edge of the first structure opposite the first location and spaced from the diffusive element by a thickness of the first structure. The light sensor is configured to detect the disrupted light.

One exemplary embodiment comprises a method of detecting light associated with light communications. The method comprises collecting light configured for the light communications via two or more waveguide entrances disposed at different locations along a total internal reflection (TIR) waveguide. The TIR waveguide comprises a first structure having a first index of refraction, where a second index of refraction abutting the first structure is less than the first index of refraction such that light entering the TIR waveguide propagates along the TIR waveguide within the first structure. The method further comprises maintaining, at each of at least one of the two or more waveguide entrances, TIR of light already propagating along the TIR waveguide within the first structure. The method further comprises disrupting the propagation of the light along the TIR waveguide using a diffusive element disposed along an internal edge of the first structure at a first location of the TIR waveguide, said first location offset along the TIR waveguide from each of the locations of the two or more waveguide entrances. The method further comprises detecting the disrupted light using a light sensor disposed adjacent an edge of the first structure opposite the first location and spaced from the diffusive element by a thickness of the first structure.

One exemplary embodiment comprises a portable device configured to be worn and/or carried by a user. The portable device comprises a detection system for light communications, which comprises a total internal reflection (TIR) waveguide and a light sensor. The TIR waveguide comprise a first structure, a diffusive element, and two or more waveguide entrances. The first structure has a first index of refraction, where a second index of refraction abutting the first structure is less than the first index of refraction such that light input to the TIR waveguide propagates along the TIR waveguide within the first structure. The diffusive element is disposed along an internal edge of the first structure at a first location of the TIR waveguide, and is configured to disrupt the propagation of the light along the TIR waveguide. The two or more waveguide entrances are each at a corresponding location offset in a first direction along the TIR waveguide from the first location. Each of the two or more waveguide entrances is configured to collect light associated with the light communications and input the collected light to the first structure at the corresponding second location to propagate the collected light to the first location. At least one of the two or more waveguide entrances is further configured to maintain TIR of the light already propagating along the TIR waveguide within the first structure. The light sensor is disposed adjacent an edge of the first structure opposite the first location and spaced from the diffusive element by a thickness of the first structure. The light sensor is configured to detect the disrupted light.

DETAILED DESCRIPTION

The use of light communications, e.g., LiFi, with WiFi or as a replacement for WiFi, has expanded the capabilities of local area wireless communications. However, the devices typically preferable for such communications are small, and have limited space available for the detectors/receivers used for such communications. Further, the space available in these devices continues to decrease due to the continual reduction in size of these devices and/or the continual addition of new features and/or hardware into these devices. For example, wearable devices (e.g., glasses, watches, etc.) are designed to have a minimal size to improve their wearability (e.g., make them lighter, more comfortable, etc.). The limited physical size of many devices, especially when combined with all the functionality intended to be included in such devices, places limitations on the location and/or size and/or number of light sensors that may be included in a light communication device.

Conventional light communication solutions require a sensor for every light capturing/entrance location of a device. For example, a device that implements light communications may include three openings in a housing of the device, where such openings are intended to, or could be used to, receive external light associated with light communications. In a conventional solution, such a device necessarily includes three sensors, one sensor disposed beneath each of the three openings, to capture the light entering each opening. Because many devices have limited space available for such sensors, such conventional solutions severely limit the number of sensors available for light communications, and thus limit the amount of light that can be collected for light communications and/or the effectiveness of light communications. Further, conventional solutions generally have challenging mechanical requirements regarding the location of the sensor and/or alignment of a sensor with the corresponding opening in order to enable the sensor to capture as much of the light entering the opening as possible. These mechanical limitations may severely limit the location options for the openings.

The solution presented herein solves many problems associated with conventional solutions by using waveguides to channel light from two or more openings to a sensor. In so doing, the solution presented herein reduces the number of sensors used for light communications, enables each sensor to capture more light associated with the light communications, and/or enables flexibility regarding the sensor size, the sensor location in the device, and/or the alignment of the sensor with any particular opening. In particular, the solution presented herein enables any number of openings to be placed anywhere on the device, while also enabling one or more sensors to be placed at any suitable location within the device, which improves the signal quality and reduces the mechanical constraints associated with LiFi.

Figure 1:
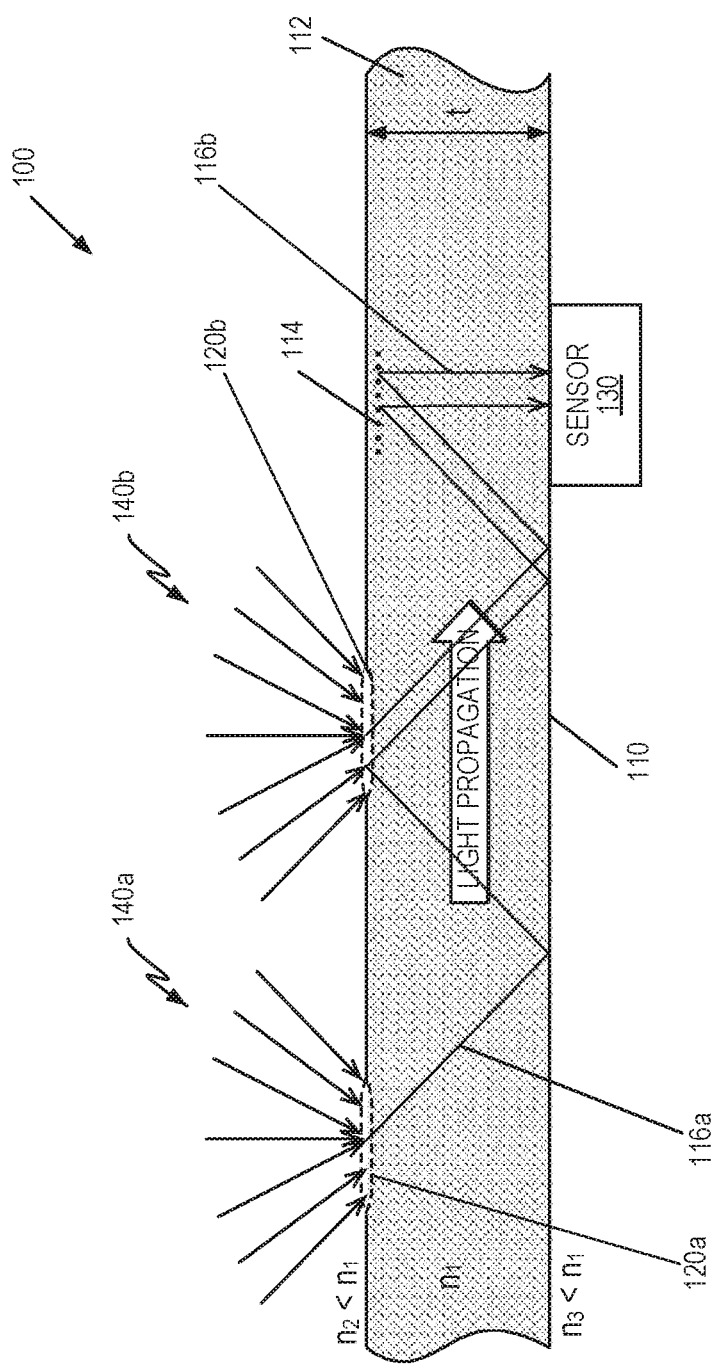
FIG. 1 shows an exemplary waveguide-based light detection system according to exemplary embodiments of the solution presented herein.

FIG. 1 shows one exemplary light detection system 100 for light communications according to embodiments of the solution presented herein. The light detection system 100 comprises a waveguide 110 and a light sensor 130. The waveguide 110 comprises a Total Internal Reflection (TIR) structure 112 through which light propagates, a diffusive element 114, and two waveguide entrances 120. Light captured at each waveguide entrance 120 propagates through the waveguide 110 within the TIR structure 112, including when it encounters another waveguide entrance 120, until it encounters the diffusive element 114. The diffusive element 114 disrupts the propagation of the light to enable detection of the light by sensor 130. The following uses generic reference numbers to generally refer to different elements, and adds a letter designation to refer to a specific one of multiple ones of the same elements. It will be appreciated that FIG. 1 only shows two waveguide entrances 120 for illustrative purposes; additional waveguide entrances 120 may be included, as discussed further below.

The propagation of the light through the TIR structure 112 is at least partially controlled by the index of refraction $n_1$ of the TIR structure 112 relative to the surrounding index/indices of refraction. When material(s) surrounding the TIR structure 112 has/have a lower refractive index than the TIR structure 112, the TIR structure 112 functions as a TIR layer, which enables the light entering the TIR structure 112 at a TIR angle to propagate along the TIR structure 112 with total internal reflection, and thus with minimal-to-no loss. Thus, the TIR structure 112 has a first index of refraction $n_1$, where indices of refraction, e.g., $n_2$ and/or $n_3$, surrounding/adjacent to the TIR structure 112 is/are less than the first index of refraction $n_1$ such that light input to the waveguide 110 propagates along the waveguide 110 within the TIR structure 112. While in some embodiments the indices of refraction surrounding the TIR structure 112 are all the same, the solution presented herein does not require the index/indices of refraction surrounding the TIR structure 112 to be equal. Instead the solution presented herein only requires that the index of refraction $n_1$ of the TIR structure 112 be greater than each index of refraction of the surrounding material so that light input into the TIR structure 112 propagates along the TIR structure 112 with total internal reflection.

The desired index of refraction relationship between the TIR structure 112 and the surrounding structure(s)/material(s) may be achieved in any number of ways. For example, when the TIR structure 112 is a cylindrical tube having a first index of refraction $n_1$, having a second index of refraction $n_2$ surrounding the tube less than the first index of refraction ($n_2 < n_1$) causes the desired total internal reflection in the TIR structure 112. In another example, when the TIR structure 112 is a right rectangular prism having the first index of refraction $n_1$, having a second index of refraction $n_2$ on one side of the TIR structure 112 that is less than the first index of refraction ($n_2 < n_1$), and a third index of refraction $n_3$ on an opposing side of the TIR structure 112 that is also less than the first index of refraction ($n_3 < n_1$), as shown in FIG. 1, causes total internal reflection in the TIR structure 112. In another example, waveguide 110 may be realized using a set of coatings or layers, where each layer/coating represents a different part of the waveguide 110. In this example, one layer may represent a TIR layer (i.e., the TIR structure 112), while one or more layers surrounding the TIR layer has a lower index of refraction than that of the TIR layer, and thus represents a "reflective" layer. Such a reflective layer may also serve as a protective layer that protects the TIR structure 112, e.g., from scratches, debris, and/or other foreign objects. Alternatively, a protective layer separate from the reflective layer may be applied between the TIR structure 112 and the reflective layer, where the protective layer has the same or lower index of refraction as the reflective layer. The protective layer may also be used to add print (e.g., text, images, etc.) that when visible to a user of the device 200 identify any desired information related to or about the device 200, e.g., brand name, model name/number, team affiliations, school affiliations, etc.

Diffusive element 114 is disposed along an internal edge of the TIR structure 112 at a predetermined location of the waveguide 110 to disrupt the propagation of the light along the TIR structure 112 for detection by the light sensor 130. The diffusive element 114 comprises any material or structure that disrupts the propagation of the light within the TIR structure 112. In some embodiments, the diffusive element 114 may direct the disrupted light to the sensor 130. In other embodiments, the diffusive element 114 may scatter the light such that at least some of the originally propagating light is captured by the sensor 130. In one exemplary embodiment, the diffusive element 114 comprises white or colored paint applied to the inner edge of the TIR structure 112 above the sensor 130. In another exemplary embodiment, the diffusive element 114 is constructed by altering the material at the location of diffusive element 114 so that this location of the TIR structure 112 is no longer flat and/or smooth. For example, machined dots may be placed at the location of the diffusive area 114 or the location of the diffusive area 114 may be etched or roughened.

The light sensor 130 is disposed adjacent to an internal edge of the TIR structure 112 opposite the location of the diffusive element 114 and generally spaced from the diffusive element by a thickness t of the TIR structure 112 so that the light sensor 130 detects the disrupted light. Light sensor 130 comprises any light sensor configured to detect the light disrupted by the diffusive element, e.g., a Photo Sensitive Receptor (PSR).

Each waveguide entrance 120 comprises an opening in the housing of a device 200 so as to collect light 140, e.g., associated with light communications, and input the collected light to the TIR structure 112 of the waveguide 110. Further, each waveguide entrance 120 is laterally offset from the location of the diffusive element 114/sensor 130, where light 140 collected at one entrance propagates along the waveguide 110 to the sensor 130. For example, waveguide entrance 120a, which is laterally offset along the waveguide 110 from the location of the diffusive element 114, collects the proximate light 140a, while waveguide entrance 120b, which is laterally offset along the waveguide 110 between waveguide entrance 120a and the diffusive element 114, as shown in FIG. 1, collects and inputs the proximate light 140b. The light 140a collected at waveguide entrance 120a propagates as light 116a within the TIR structure 112, while the light 140b collected at waveguide entrance 120b propagates as light 116b within the TIR structure 112.

According to the solution presented herein, each waveguide entrance 120 in one exemplary embodiment, or at least all but the waveguide entrance farthest from the diffusive element 114 along the TIR waveguide 110 (e.g., an initial waveguide entrance 120a at one end of the TIR waveguide 110), is configured to maintain the TIR of light already propagating within the TIR structure 112, in addition to collecting and directing external light 140 into the TIR structure 112. To that end, each waveguide entrance 120, or at least all but the initial waveguide entrance 120a, comprises a light guide structure 122.

Figure 2:
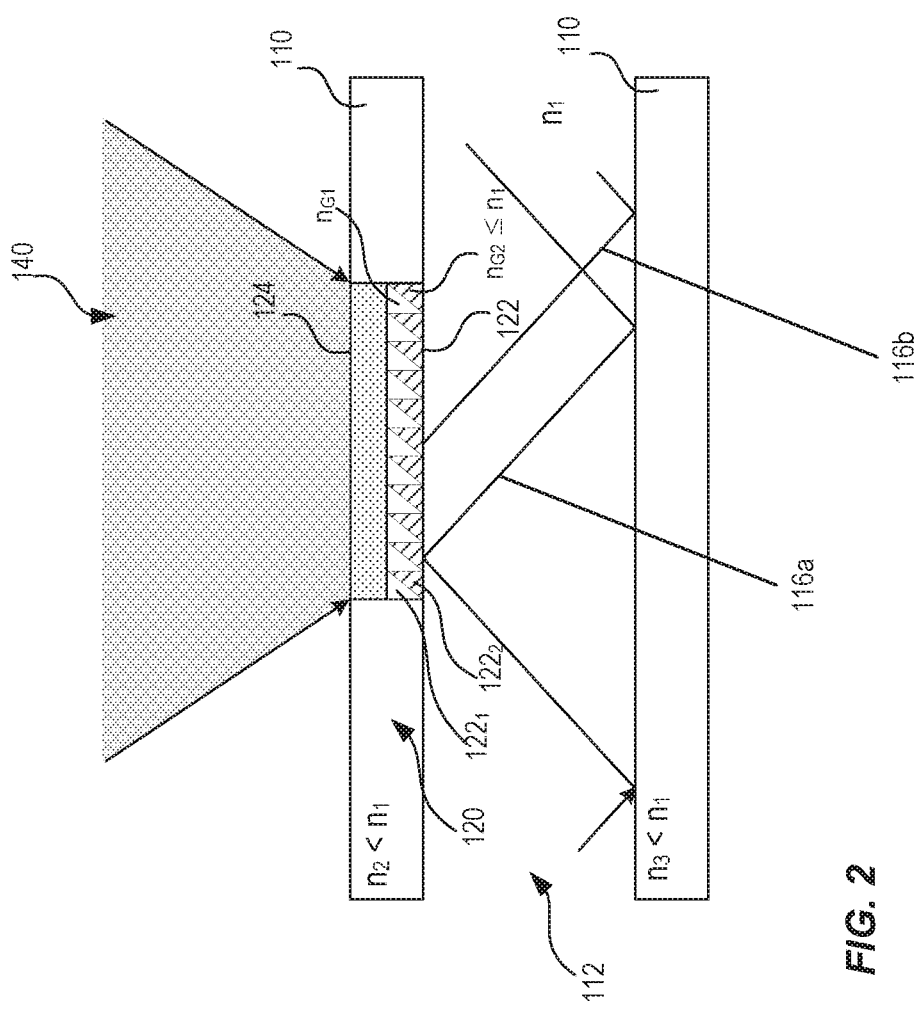
FIG. 2 shows an exemplary waveguide entrance according to exemplary embodiments of the solution presented herein.

FIG. 2 shows an exemplary waveguide entrance 120 that includes a light guide structure 122. As shown in FIG. 2, the light guide structure 122 redirects the light collected by the waveguide entrance 120 such that the collected light 140 enters the TIR structure 112 at a total internal reflection angle to facilitate propagation of the collected light within the TIR structure, e.g., along path 116b. To continue the propagation of the light already within the TIR structure 112, e.g., along path 116a, the surface of the light guide structure 122 abutting the TIR structure 112 is configured to maintain the total internal reflection of the light already propagating within the TIR structure 112. In so doing, the solution presented herein enables the sensor 130 to detect light from multiple paths of light 116a, 116b collected at multiple waveguide entrances 120a, 120b.

Various techniques may be used to configure the light guide structure 122 to collect and input the light 140 into the TIR structure 112, while also maintaining the propagation of light already in the TIR waveguide 110 within the TIR structure 112. For example, the surface of the light guide structure 122 abutting the TIR structure 112 may be polished to align with the TIR structure 112 to prevent the already propagating light from experiencing any irregular reflections, where an index of refraction of this surface, i.e., the side of the light guide structure 122 abutting the TIR structure 112, is less than the index of refraction of the TIR structure 112. In other exemplary embodiments, the surface of the light guide structure 122 abuts the TIR structure 112 via a coating having an index of refraction less than that of the TIR structure 112. In either case, this may mean the index of refraction of the surface of the light guide structure 122 abutting the TIR structure 112 is equal to the index of refraction of the surrounding TIR waveguide, e.g., equal to $n_2$ or equal to $n_3$. According to one exemplary embodiment, light guide structure 122 comprises a dual index element, where the light entering the light guide structure 122 passes through a material $122_1$ having a first light guide index $n_{G1}$ to a material $122_2$ having a second light guide index $n_{G2}$, where the second light guide index $n_{G2}$ is less than or equal to that of the TIR structure 112 (i.e., $n_{G2} \leq n_1$), and where the relationship between $n_{G1}$ and $n_{G2}$, and where the angle of the materials $122_1$, $122_2$ relative to each other, are configured to cause the incoming light to bend to enter the TIR structure 112 at an angle appropriate to cause the light to enter the TIR structure 112 at an angle suitable for TIR within the TIR structure 112. While not expressly shown by FIG. 2, $n_{G1}$ may be the same as the index of refraction of the light collection element 124 (if present) or the same as the surrounding material or air.

In some embodiments, the waveguide entrances 120 may include a collection element 124, e.g., a lens or lens system (e.g., as shown in FIG. 2), where the collection element 124 is configured to increase the amount of external light 140 that is input into the waveguide 110. For example, in some embodiments, collection element 124 collimates the collected light 140 to increase the amount of collected light that enters the TIR structure 112 at the TIR angle. Thus, collection element 124 enables more light to be captured for light communications, even light that enters the waveguide 110 at an angle. When the waveguide entrance 120 includes a collection element 124, generally the collection element 124 will have a wide Field of View (FoV) to increase the amount of collected light. Exemplary collection elements 124 include, but are not limited to a Fresnel lens 124a (FIG. 5), a plano-convex lens 124c (FIG. 5), etc. It will be appreciated that the use of any collection element 124 in one or more waveguide entrances 120 is optional. In some exemplary embodiments, the light guide structure 122 and the corresponding lens 124 collectively form a dual layer Fresnel lens, where the lens 124 is a first (top) layer of the dual layer Fresnel lens that collects the light 140 and light guide structure 122 is a second (bottom) layer of the dual layer Fresnel lens that directs the light into the TIR structure 112 at the TIR angle. In this example, a first (top) side of the light guide structure 112 is adjacent to the lens 124 and receives the collected light, while a second (bottom) side of the light guide structure 122 abuts the TIR structure 112 and directs the collected light into the TIR structure 112 at a TIR angle while also maintaining the TIR of any light already propagating within the TIR structure 112.

Figure 3:
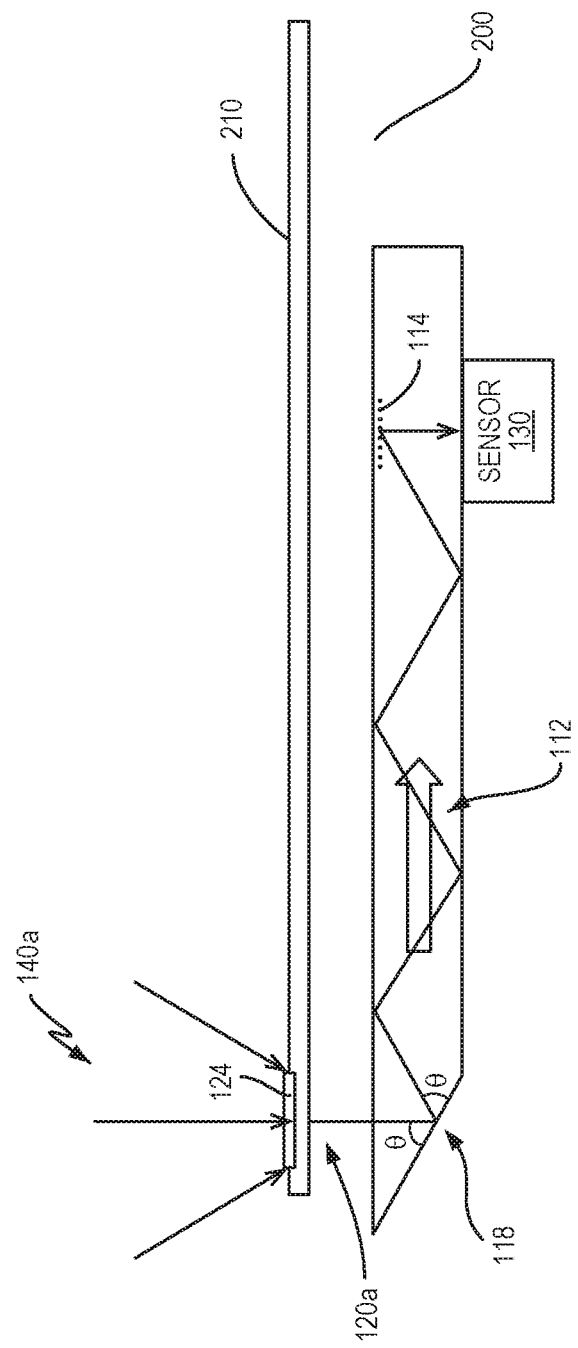
FIG. 3 shows an exemplary waveguide-based light detection system according to further exemplary embodiments of the solution presented herein.
Figure 4:
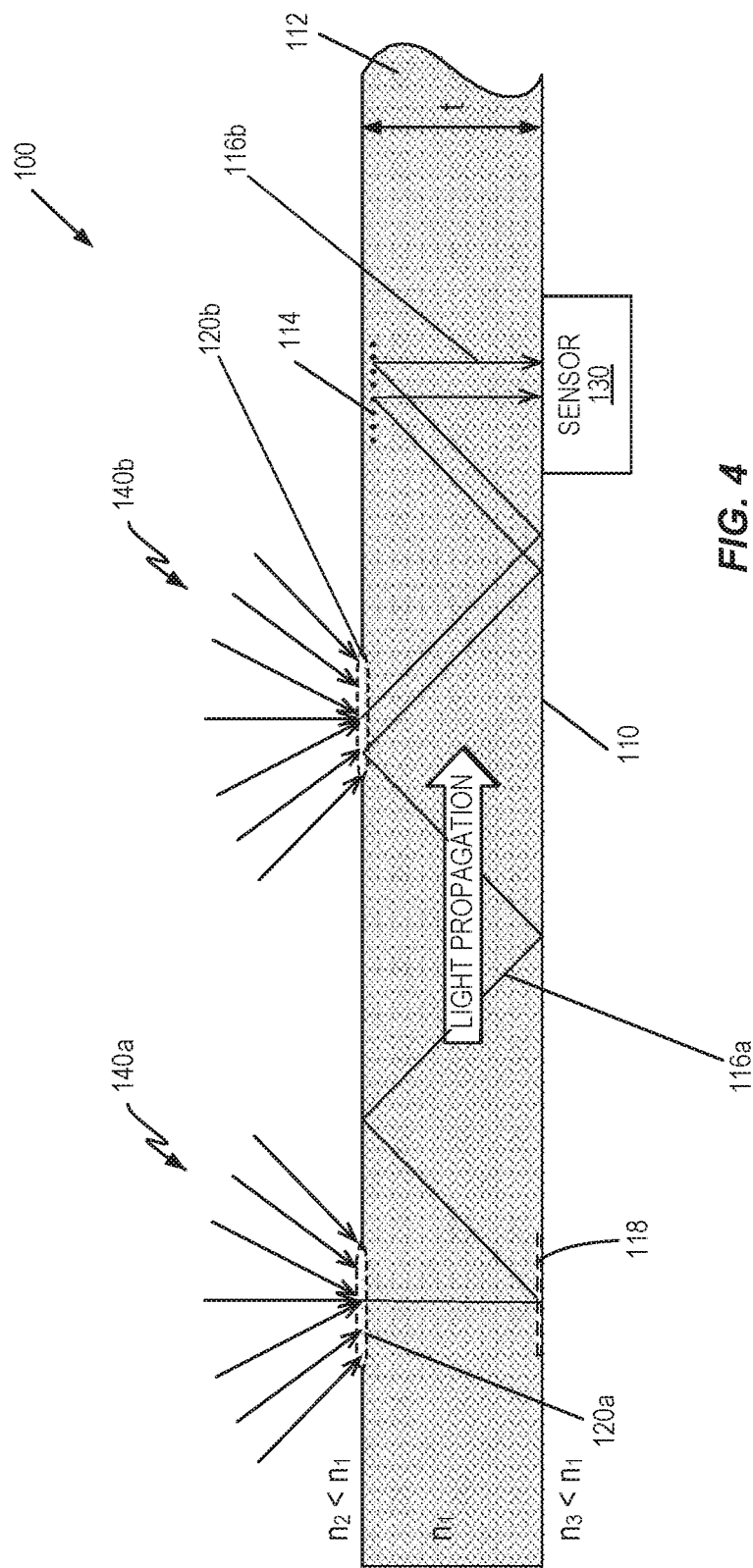
FIG. 4 shows an exemplary waveguide-based light detection system according to further exemplary embodiments of the solution presented herein.

The waveguide entrance 120 farthest along the waveguide 110 from the sensor 130, referred to herein as the initial waveguide entrance 120a, may be configured to maintain TIR of light already propagating within the TIR structure 112, but such is not required. In some embodiments, the initial waveguide entrance 120a may employ a different type of guiding structure than discussed above to facilitate the propagation of the collected light into the TIR structure 112 without the requirement to maintain the propagation of any already propagating light (for the sole reason that no light has been collected prior to this initial waveguide entrance 120a). For example, FIGS. 3 and 4 show waveguides 110 comprising a light guiding element 118 opposite the initial waveguide entrance 120a that is configured to facilitate the propagation of the collected light from the initial waveguide entrance 120a along the TIR structure 112. In one exemplary embodiment, the light guiding element 118 comprises a reflector configured to reflect the light collected by the corresponding initial waveguide entrance 120a at a total internal reflection angle to facilitate the propagation of the collected light along the TIR structure 112. One exemplary reflector includes an angled mirror 118, as shown in FIG. 3, which reflects the incident light at an angle $\theta$ equivalent to the entry angle $\theta$. To implement the total internal reflection, this angle $\theta$ may be equivalent to the total internal reflection angle for the waveguide 110. While FIG. 3 only shows the initial waveguide entrance 120a, it will be appreciated that other waveguide entrances 120 may be included as discussed herein. Additional reflectors include, but are not limited to, a plurality of etched surfaces, as shown in FIG. 4, mirror print or a material with a lower refractive index so that the angle $\theta$ of the light exiting the light guiding element 118 is the same as the angle of incidence on the light guiding element 118, etc. In another exemplary embodiment, the light guiding element 118 comprises a bend proximate the corresponding initial waveguide entrance 120a (not shown), where the bend is configured to direct the collected light at the total internal reflection angle to facilitate the propagation of the collected light along the TIR structure 112.

Figure 5:
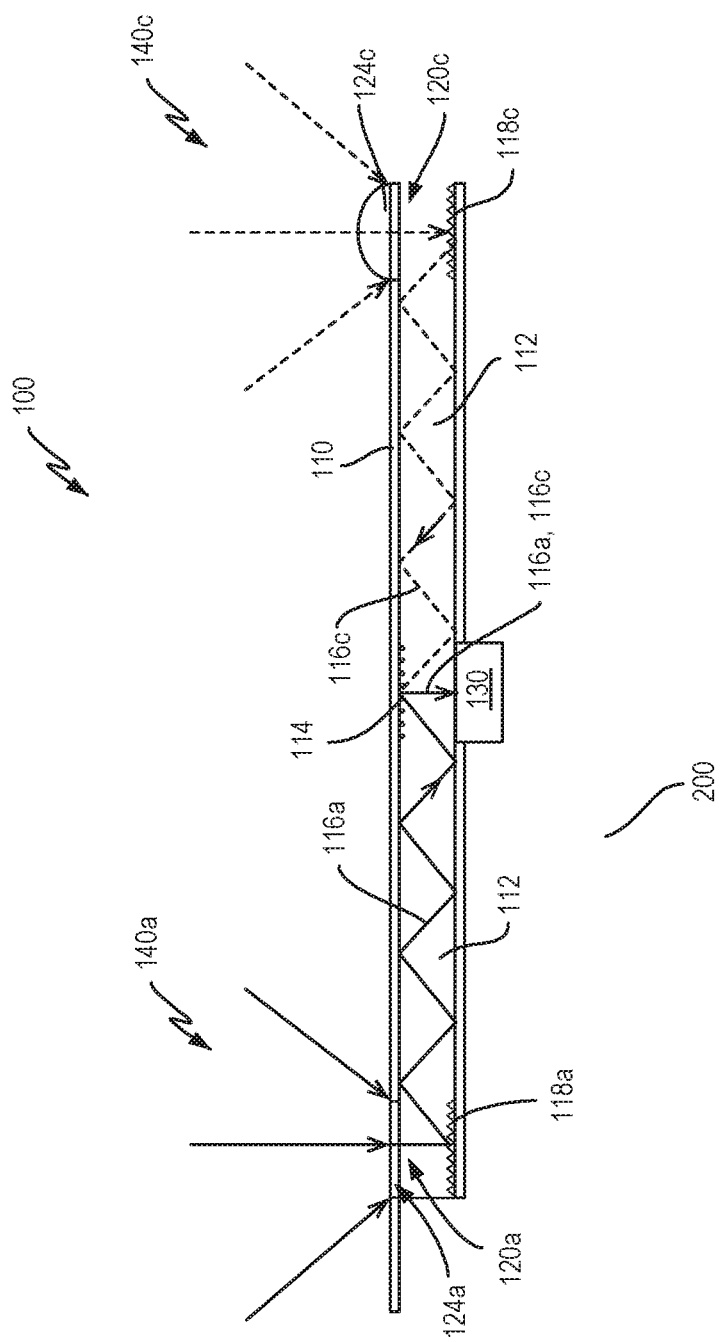
FIG. 5 shows an exemplary waveguide-based light detection system according to further exemplary embodiments of the solution presented herein.

The exemplary light detection systems 100 of FIGS. 1-4 show waveguide entrances 120 all laterally offset from to one lateral side of sensor 130 in one direction providing light to the sensor 130. The solution presented herein, however is not so limited. Alternative embodiments may include multiple waveguide entrances 120 on either side of the sensor (along the waveguide 110) that collect light for propagation along one or more corresponding waveguides 110 to the sensor 130. FIG. 5 shows an exemplary embodiment with multiple waveguide entrances 120 on opposing sides of the sensor 130 channeling light to the sensor 130. As shown in FIG. 5, light sensor 130 may detect light originating from waveguide entrance 120a and waveguide entrance 120b located on opposing sides of the TIR waveguide 110 from the light sensor 130. In this exemplary embodiment, waveguide entrance 120a and lens 124a collects light 140a, light guiding element 118a establishes the TIR angle for the collected light to propagate 116a the collected light along the TIR structure 112 towards the sensor 130 in a first direction. Further, waveguide entrance 120c and lens 124c collects light 140c, light guiding element 118c establishes the TIR angle for the collected light to propagate 116c the collected light along the TIR structure 112 towards the sensor 130 in a second direction opposite the first direction. The diffusive element 114 disrupts the propagation 116a, 116c, from both directions, of the light collected by the waveguide entrances 120a, 120c for detection by sensor 130. While FIG. 5 shows each waveguide entrance 120 having a light guiding element 118, it will be appreciated that one or both of these waveguide entrances 120 may alternatively include the light guide structure 122, e.g., shown in FIG. 2. Further, while FIG. 5 shows only one waveguide entrance 120 on each side of the sensor 130, it will be appreciated that the solution presented herein allows for multiple waveguide entrances 120 on either side, or on both sides, of the sensor 130. For example, one or more additional waveguide entrances 120 may be disposed between waveguide entrance 120a and sensor 130, as shown in FIG. 1, and/or between waveguide entrance 120c and sensor 130.

In some embodiments, multiple waveguide entrances 120 use the same waveguide 110 to propagate the light to a single sensor 130, e.g., as shown in FIGS. 1-5. In other embodiments, multiple waveguides 110 propagate light from two or more waveguide entrances 120 to a single sensor 130. In addition, the location of one or more waveguide entrances 120 relative to the sensor may be selected to reduce noise and/or increase the signal strength. For example, the lateral spacing between multiple waveguide entrances 120 and the corresponding sensor 130 may be configured such that the light entering the sensor 130 adds constructively. Alternatively or additionally, the lateral spacing between multiple waveguide entrances 120 and the corresponding sensor 130 may be configured such that interference present in the collected light adds destructively or neutrally.

While FIGS. 1-5 show exemplary detection systems 100 having only one sensor 130, it will be appreciated that the detection system 100 disclosed herein may include more than one sensor 130. Further, while FIGS. 1-5 show exemplary detection systems 100 having 1-3 waveguide entrances 120, it will be appreciated that the detection system 100 disclosed herein may include any number of waveguide entrances 120. In general, detection system 100 may comprise any number of waveguide entrances 120 and/or waveguides 110, where each waveguide entrance 120 is located at a location of the waveguide 110 laterally offset from the sensor 130 and diffusive element 114, such that light communications are implemented using fewer sensors 130 than waveguide entrances 120 and/or waveguides 110. In so doing, the solution presented herein reduces the number of sensors 130 associated with light communications, while simultaneously improving the quality of the light communications, e.g., by increasing the amplitude of the detected light. Further, by using waveguides to direct the light from multiple entrances 120 to the sensor(s) 130, the solution presented herein relaxes limitations previously placed on the sensor(s) 130, e.g., the size, power, etc., because the sensor(s) 130 may now be placed at any suitable location in the device 200.

Figure 6:
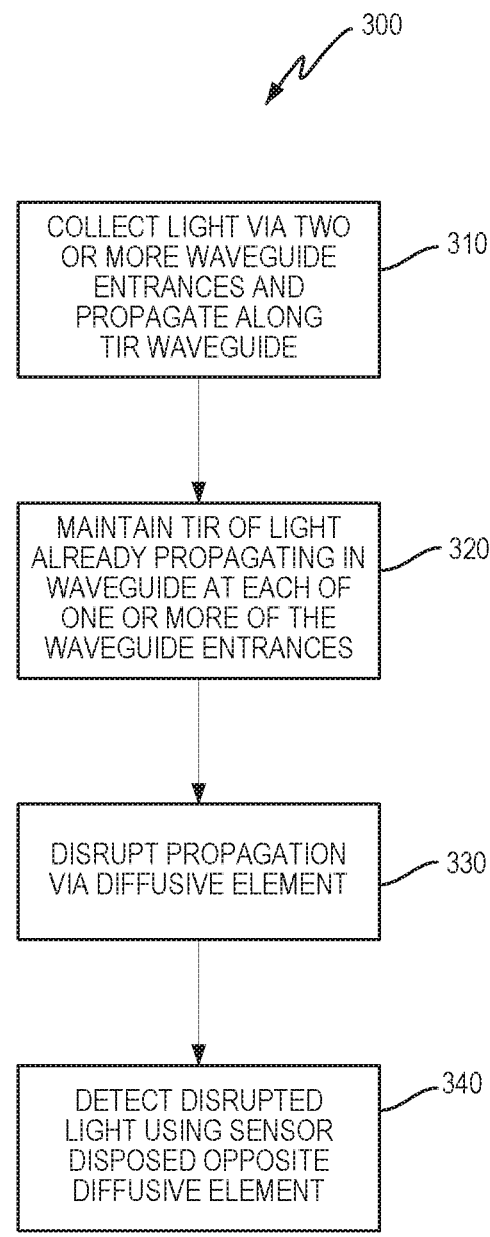
FIG. 6 shows an exemplary method for detecting light for light communications according to exemplary embodiments of the solution presented herein.

FIG. 6 shows an exemplary method 300 of detecting light associated with light communications. The method comprises collecting (block 310) light configured for the light communications via two or more waveguide entrances 120 disposed at different locations along a total internal reflection TIR waveguide 110. The TIR waveguide 110 comprises a TIR structure 112 having a first index of refraction $n_1$, where a second index of refraction $n_2$ and/or $n_3$ adjacent the TIR structure 112 is less than the first index of refraction $n_1$ such that light entering the TIR waveguide 110 propagates along the TIR waveguide 110 within the TIR structure 112. The method further comprises maintaining (block 320), at each of at least one of the two or more waveguide entrances 120, total internal reflection of light already propagating along the TIR waveguide 110 within the TIR structure 112. The method further comprises disrupting (block 320) the propagation of the light along the TIR waveguide 110 using a diffusive element 114 disposed along an internal edge of the TIR structure 112 at a first location of the TIR waveguide 110. The first location is offset (laterally) along the TIR waveguide 110 from each of the locations of the two or more waveguide entrances 120. The method further comprises detecting (block 340) the disrupted light using a light sensor 130 disposed adjacent an edge of the TIR structure 112 opposite the first location and spaced from the diffusive element 114 by a thickness t of the TIR structure 112.

As mentioned above, the light detection system 100 of the solution presented herein may be implemented in and/or as part of any number of wireless devices 200 that implement light communications. Exemplary devices 200 may be worn and/or carried by a user, where the light detection system 100 disclosed herein may be internal to a housing of a device 200, disposed partially internally to the device 200 and partially integrated with/disposed on the housing of the device, or implemented on an external surface of the housing of the device 200.

Figure 7A:
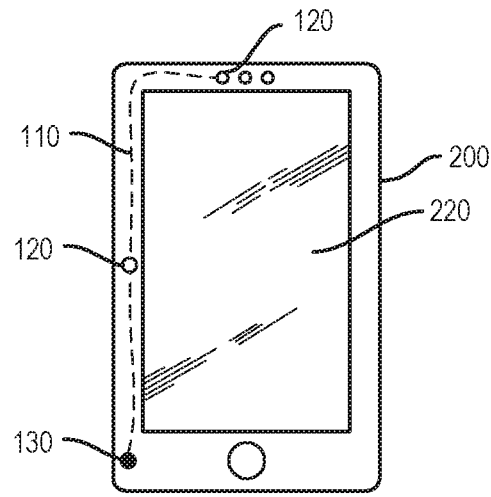
FIGS. 7A-7C show an exemplary device comprising the light detection system according to exemplary embodiments of the solution presented herein.
Figure 7B:
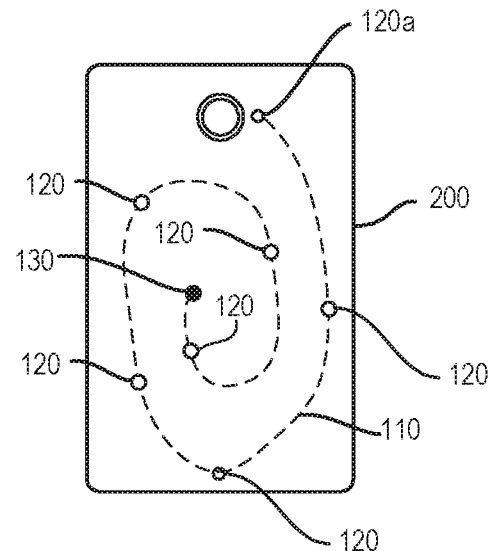
Figure 7C:
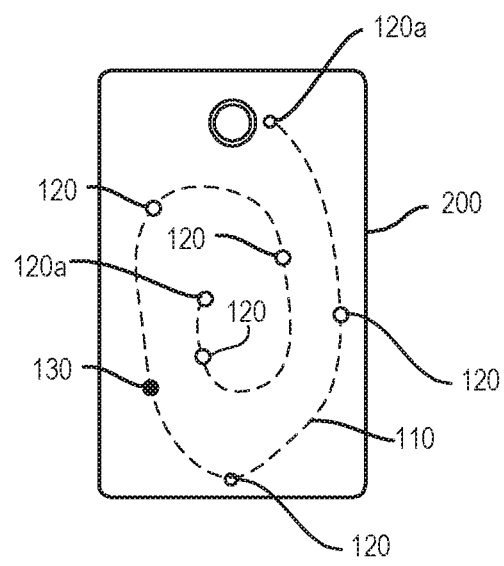

FIGS. 7A-7C show an exemplary smart phone device 200. Smart phone device 200 may comprise waveguide entrances 120 around the display 220 along the perimeter of the housing 210, as shown in FIG. 7A. Alternatively or additionally, device 200 may comprise waveguide entrances 120 on a back of the smart phone device 200, as shown in FIGS. 7B and 7C. It will be appreciated that sensor 130 may be disposed at any location along the waveguide 110. For example, sensor 130 may be disposed at the end of the waveguide 110 such that the sensor 130 captures light form multiple waveguide entrances 120 disposed along the waveguide leading up to the sensor 130, e.g., as shown in FIG. 7B. In another example, the sensor 130 may be disposed somewhere between the ends of the waveguide such that the sensor 130 captures light form multiple waveguide entrances 120 disposed along the waveguide leading up to the sensor 130 in two different directions, e.g., as shown in FIG. 7C. In the example of FIG. 7C, the waveguide 110 may include two initial waveguide entrances 120*a*, e.g., at each end of the waveguide 110. Further, while not explicitly shown, it will be appreciated that the waveguide entrances 120 may be integrated with the display 220. It will be appreciated that the integration of waveguide entrance(s) 120 with the display 220 may include placing the waveguide entrance(s) 120 below a transparent type of display 220, e.g., an Active-Matrix Organic Light-Emitting Diode (AMOLED) screen/display. It will further be appreciated that the waveguide solution presented herein enables multiple waveguide entrances 120 to be placed at any suitable location on the smart phone device 200, besides those explicitly shown, while simultaneously enabling a single sensor 130 (or fewer sensors 130 than there are waveguide entrances 120), placed in the device 200 at any location suitable for the sensor 130, to detect the light from the multiple entrances 120, and thus enable the light communications.

Figure 8:
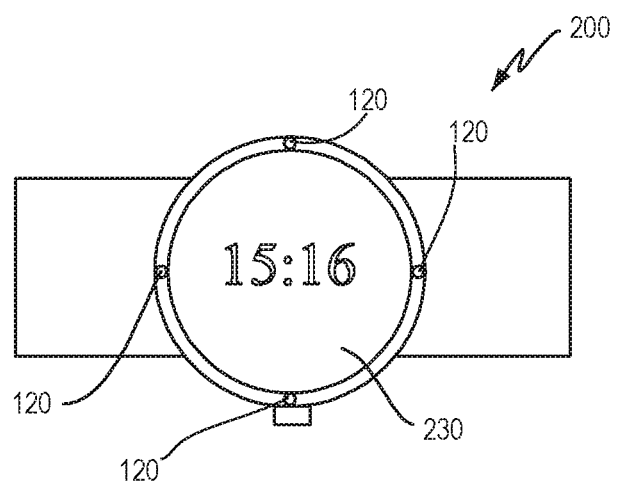
FIG. 8 shows an exemplary device comprising the light detection system according to further exemplary embodiments of the solution presented herein.
Figure 9:
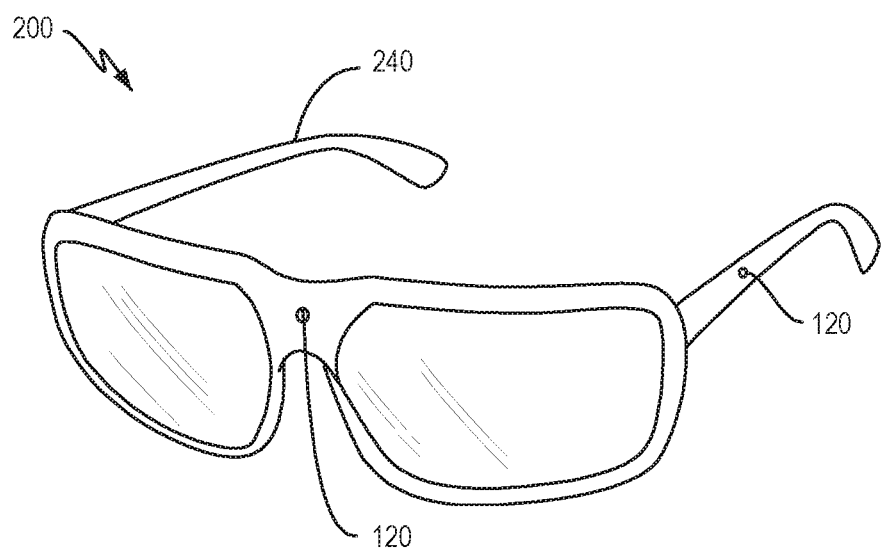
FIG. 9 shows an exemplary device comprising the light detection system according to further exemplary embodiments of the solution presented herein.

In another exemplary embodiment, the device 200 comprises a watch, as shown in FIG. 8. For the watch embodiment, the waveguide entrances 120 may be placed at any suitable location, e.g., around the face 230 of the watch and/or in a bezel of the watch, integrated with the display of the watch (not shown), as part of the face of the watch (not shown), etc. In yet another exemplary embodiment, shown in FIG. 9, the device 200 comprises glasses, where the waveguide entrances 120 are disposed along a frame 240 of the glasses. In addition to the smartphone, watch, and glasses implementations discussed herein, the solution presented herein is also applicable to any wireless devices implementing light communications. For example, other exemplary devices 200 include, but are not limited to, hearing aids, fitness monitors, cellular telephones, laptop computers, tablets, etc.

The solution presented herein accommodates multiple collection points along the waveguide by configuring each waveguide entrance, or at least all but the first waveguide entrance farthest along the waveguide from the sensor (i.e., the initial waveguide entrance), to not only collect and input light into the waveguide, but also to maintain the total internal reflection of the light already propagating within the TIR structure. By using multiple waveguide entrances to provide light to a single sensor, the solution presented herein increases the amount of light available for light communications, even when the light associated with the light communications enters the device at an angle. Further, because each waveguide channels light from multiple collection points to a single sensor, the solution presented herein reduces the number of sensors needed for the light communications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A detection system for light communications, the detection system comprising:
    a total internal reflection (TIR) waveguide comprising:
        a first structure having a first index of refraction, wherein a second index of refraction abutting the first structure is less than the first index of refraction such that light input to the TIR waveguide propagates along the TIR waveguide within the first structure;
        a diffusive element disposed along an internal edge of the first structure at a first location of the TIR waveguide, said diffusive element configured to disrupt the propagation of the light along the TIR waveguide;

two or more waveguide entrances, each at a corresponding location offset in a first direction along the TIR waveguide from the first location, each of the two or more waveguide entrances configured to:
- collect light associated with the light communications; and
- input the collected light to the first structure at the corresponding location to propagate the collected light to the first location;
- wherein at least one of the two or more waveguide entrances is further configured to maintain TIR of the light already propagating along the TIR waveguide within the first structure; and a light sensor disposed adjacent an edge of the first structure opposite the first location and spaced from the diffusive element by a thickness of the first structure, said light sensor configured to detect the disrupted light.

2. The detection system of claim 1 wherein:
the two or more waveguide entrances comprise:
- a first waveguide entrance having a location offset from the first location along the TIR waveguide in a first direction; and
- a second waveguide entrance having a location between the location of the first waveguide entrance and the first location;

the diffusive element is configured to disrupt, at the first location, the propagation of the light collected from the first and second waveguide entrances; and
the light sensor is configured to detect the disrupted light associated with the first and second waveguide entrances.

3. The detection system of claim 2 wherein:
the two or more waveguide entrances further comprises a third waveguide entrance having a location offset from the first location along the TIR waveguide in a second direction different from the first direction;
the diffusive element is configured to disrupt, at the first location, the propagation of the light collected from the first, second, and third waveguide entrances; and
the light sensor is configured to detect the disrupted light associated with the first, second, and third waveguide entrances.

4. The detection system of claim 3 wherein the first and second directions comprise opposite directions.

5. The detection system of claim 1 wherein each of at least one of the two or more waveguide entrances comprises a light guide structure abutting the first structure of the TIR waveguide and configured to direct the collected light into the TIR waveguide at an angle conducive for TIR reflection within the first structure.

6. The detection system of claim 5 wherein:
each waveguide entrance further comprises a lens configured to collect the light;
a first side of the corresponding light guide structure is adjacent to the lens and an index of refraction between the lens and the first side of the light guide structure is less than the second index of refraction; and
a second side of the corresponding light guide structure, opposite the first side, abuts the first structure of the TIR waveguide.

7. The detection system of claim 5 wherein:
a first side of each light guide structure receives the collected light and a second side of the light guide structure, opposite the first side, abuts the first structure of the TIR waveguide; and the second side of the light guide structure is configured to maintain the TIR of the light already propagating along the TIR waveguide within the first structure.

8. The detection system of claim 7 wherein the second side of each light guide structure is polished to align with the first structure of the TIR waveguide and has the first index of refraction.

9. The detection system of claim 7 wherein the second side of each light guide structure aligns with the first structure of the TIR waveguide and comprises a coating having the first index of refraction abutting the first structure.

10. The detection system of claim 1 wherein:
the TIR waveguide comprises a multi-layer coating having at least three layers; and
the first structure comprises a middle layer of the multi-layer coating.

11. The detection system of claim 10 wherein:
the multi-layer coating comprises:
- a first layer adjacent at least one of the two or more waveguide entrances and comprising the second index of refraction;
- the middle layer abutting the first layer; and
- a second layer abutting the middle layer, said second layer comprising the second index of refraction; and
the thickness of the first structure comprises the distance between the first and second layers.

12. The detection system of claim 11 wherein the second layer may further be adjacent to at least one of the two or more waveguide entrances.

13. The detection system of claim 10 wherein the multi-layer coating is at least partially disposed on an external portion of a device comprising the detection system.

14. The detection system of claim 1 wherein:
the TIR waveguide further comprises a light guiding element disposed along an internal edge of the first structure opposite an initial one of the two or more waveguide entrances;
said light guiding element configured to facilitate the propagation of the collected light from the corresponding initial waveguide entrance along the TIR waveguide; and
the initial waveguide entrance comprises the waveguide entrance farthest along the TIR waveguide from the first location.

15. A method of detecting light associated with light communications, the method comprising:
collecting light configured for the light communications via two or more waveguide entrances disposed at different locations along a total internal reflection (TIR) waveguide, said TIR waveguide comprising a first structure having a first index of refraction, wherein a second index of refraction abutting the first structure is less than the first index of refraction such that light entering the TIR waveguide propagates along the TIR waveguide within the first structure;
maintaining, at each of at least one of the two or more waveguide entrances, TIR of light already propagating along the TIR waveguide within the first structure;
disrupting the propagation of the light along the TIR waveguide using a diffusive element disposed along an internal edge of the first structure at a first location of the TIR waveguide, said first location offset in a first direction along the TIR waveguide from each of the locations of the two or more waveguide entrances; and
detecting the disrupted light using a light sensor disposed adjacent an edge of the first structure opposite the first location and spaced from the diffusive element by a thickness of the first structure.

16. The method of claim 15 wherein said:
collecting the light configured for light communications comprises:
  collecting light at a first waveguide entrance having a location offset from the first location along the TIR waveguide in the first direction; and
  collecting light at a second waveguide entrance having a location between the location of the first waveguide entrance and the first location;
disrupting the propagation of the light comprises disrupting, at the first location, the propagation of the light collected from the first and second waveguide entrances; and
detecting the disrupted light comprises detecting the disrupted light associated with the first and second waveguide entrances.

17. The method of claim 16 wherein said:
collecting the light configured for light communications further comprises collecting light at a third waveguide entrance having a location offset from the first location along the TIR waveguide in a second direction different from the first direction;
disrupting the propagation of the light comprises disrupting, at the first location, the propagation of the light collected from the first, second, and third waveguide entrances; and
detecting the disrupted light comprises detecting the disrupted light associated with the first, second, and third waveguide entrances.

18. The method of claim 17 wherein the first and second directions comprise opposite directions.

19. The method of claim 15 wherein said collecting the light configured for light communications comprises directing the collected light into the TIR waveguide at an angle conducive for TIR reflection within the first structure using a light guide structure abutting the first structure of the TIR waveguide in each of at least one of the two or more waveguide entrances.

20. The method of claim 19 wherein said collecting the light configured for light communications further comprises:
  collecting the light configured for light communications using a lens in each waveguide entrance;
  wherein a first side of the corresponding light guide structure is adjacent to the lens and a second side of the corresponding light guide structure, opposite the first side, abuts the first structure of the TIR waveguide.

21. The method of claim 19 wherein:
  a first side of each light guide structure receives the collected light and a second side of the light guide structure, opposite the first side, abuts the first structure of the TIR waveguide; and
  the second side of the light guide structure is configured to maintain the TIR of the light already propagating along the TIR waveguide within the first structure.

22. The method of claim 21 wherein the second side of each light guide structure is polished to align with the first structure of the TIR waveguide and has the first index of refraction.

23. The method of claim 21 wherein the second side of each light guide structure aligns with the first structure of the TIR waveguide and comprises a coating having the first index of refraction.

* * * * *